April 2, 1940.   C. G. SWISHER   2,196,129
AGRICULTURAL IMPLEMENT
Filed April 19, 1939
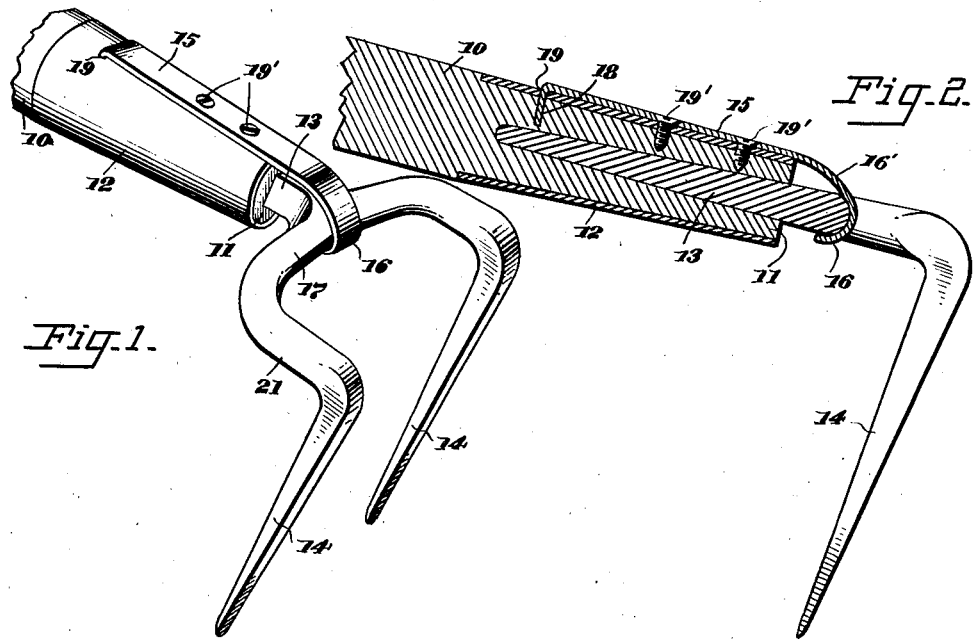
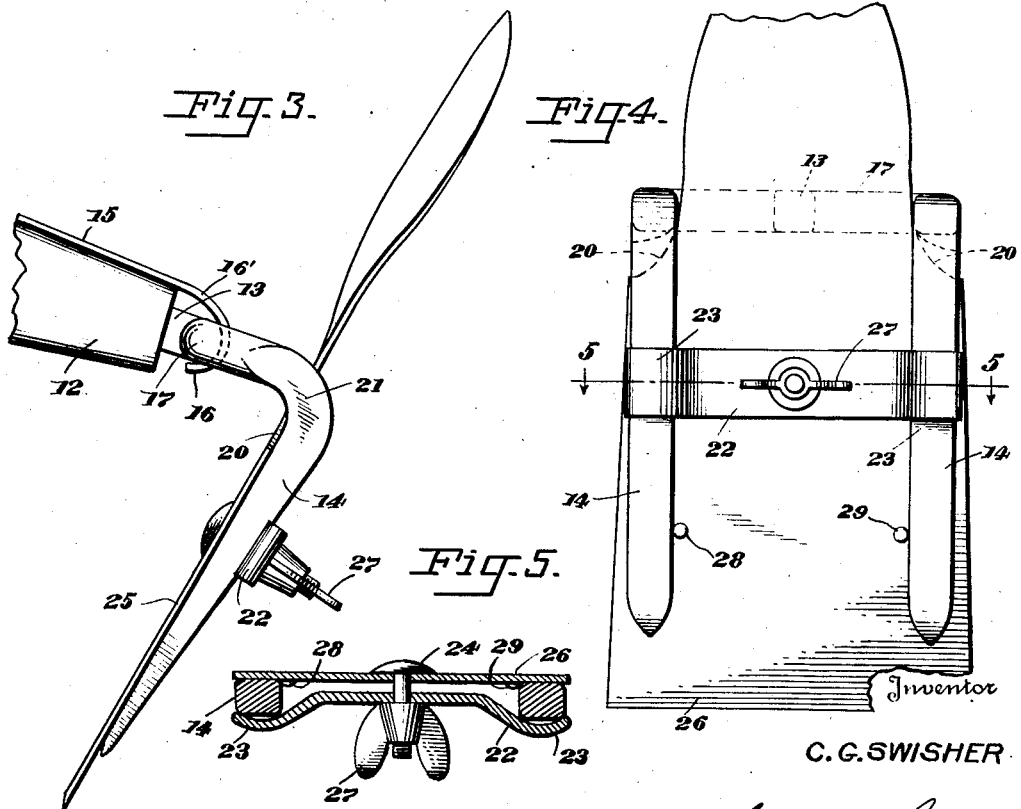
Inventor
C. G. SWISHER

UNITED STATES PATENT OFFICE 2,196,129

AGRICULTURAL IMPLEMENT

Cleveland G. Swisher, Macon, Ga.

Application April 19, 1939, Serial No. 268,812

4 Claims. (Cl. 306—41)

This invention relates to a combination agricultural appliance; and more particularly, to the method and means of securely fastening such devices together.

In the past it has been a common practice to insert a shank or tine of an agricultural device, such as a hoe or rake, into the lower end of the handle. These members after a short period of use become loose and are continuously dropping out. One method of avoiding this has been to rivet the parts together. This is not satisfactory because the riveting operation does not provide a secure connection and the cost of riveting is excessive. Furthermore, the riveting connections weaken the cross section of the tine as well as the handle.

One object of this invention is to avoid the difficulties heretofore mentioned.

A further object is to provide an implement which can be used for various types of agricultural operations.

Another object is to provide an implement which can be transformed from a rake into a scraper or a cultivator or a hoe, etc.

Still another object is to provide a base implement which will not be easily separated in use.

Other objects and advantages of this invention will be determined from the following specification taken in connection with the attached drawing.

In the drawing, wherein like reference characters indicate corresponding parts in the various figures—

Figure 1 indicates, in perspective, the cultivator tool attached to a handle;

Figure 2 is a longitudinal cross section substantially through the center of the device of Figure 1;

Figure 3 is a side elevation indicating a small size hoe or furrower attached to the cultivator;

Figure 4 is an end view showing the construction in the form of a hoe; and

Figure 5 is an enlarged detail on the line 5—5 of Figure 4.

Considering the drawing in greater detail: A portion of the device incorporating features of this invention is shown in Figure 1, comprising a handle 10 having a reduced tapered portion 11 extending through a metal ferrule 12, and having the tine or shank 13 of the bifurcated cultivator tool 14 extending into the handle, as clearly shown in Figure 2.

A keeper 15 having a bent arcuate portion 16 is arranged to engage the yoke part 17 of the cultivator at one end and having an angularly extending part 18 at its opposite end extending through a slot 19 in the ferrule and into the wood of the handle. To complete the locking engagement, one or more screws 19' are threaded through the keeper 15, the ferrule 12, and the wood 11 of the handle, and are of such length as to avoid engaging the shank 13 of the cultivator. Under appropriate conditions it may be desirable to weld the keeper to the ferrule instead of using screws, or in addition to the screws, the first described practice being preferable, however.

An inspection of Figure 2 will clearly illustrate this construction; and it shows the positive manner in which both the implement and the tool are secured together so that neither can be separated from the other. The keeper 15 on the one hand prevents the handle from being withdrawn from the ferrule; and on the other hand, keeps the cultivator from being pulled out of the handle.

It may be desirable to bend the keeper 15 at 16' (Fig. 2) to more closely fit upon the shank and yoke. A further variation would be to dispense with the slot 19 and extend the part 18 to the large end of ferrule 15 directly into the handle; or furthermore to also extend part 16 completely around to make a loop with both ends embedded in the wood handle.

In Figures 3, 4, and 5, the device has been transformed into a different agricultural implement by combinedly adding a furrower, hoe, rake, or other tool element, in secured relation to the tines of the cultivator. Each of these implements is so organized that the cultivator parts hold it firmly against relative movement. The furrower of Figure 3 and the hoe of Figure 4 have shoulders 20 which engage against the lower surface of the parts 21 of the cultivator, and bosses 28 and 29 to engage the tines 14, thereby preventing the tool from moving relatively with respect to the cultivator.

A metal binder strip 22 has arcuate portions 23 adapted to engage the tines or the prongs 14 of the cultivator. The square shank bolt 24 binds the harrower 25 or hoe 26 by means of a wing nut 27 to the cultivator. It will be readily understood that all of the parts of the tool are securely and firmly held together while in use. They can be changed, however, for different types of agricultural work with a mere loosening of the thumb nut and substitution of one tool element for another. Even with all of the tool elements removed, the implement is still suitable for agricultural work in having the cultivator element of Figure 1 securely attached to it.

Although a preferred embodiment of this invention is illustrated and described, variations within the true spirit and scope of the same are to be determined by the appended claims.

What I claim is:

1. A combination agricultural appliance comprising a handle, a ferrule surrounding an end of the handle, a cultivator having a tapered shank secured in the portion of said handle housed in said ferrule, and a keeper extending through said ferrule and into said handle at one end and gripping said cultivator at its other end whereby the handle cannot come loose from the ferrule and the cultivator cannot come loose from the handle.

2. A combination agricultural appliance comprising a handle, a ferrule surrounding an end of the handle, a cultivator having a tapered extension secured in the portion of the handle housed in said ferrule, and means extending through said ferrule and into said handle and gripping said cultivator whereby the handle cannot come loose from the ferrule and the cultivator cannot come loose from the handle.

3. A combination agricultural appliance comprising a handle, a ferrule surrounding an end of the handle, a cultivator having a yoke portion and a tapered extension secured in the portion of the handle housed in said ferrule, means extending through said ferrule and into said handle and gripping said cultivator whereby the handle cannot come loose from the ferrule and the cultivator cannot come loose from the handle, comprising a keeper having one part extending through a slot in the ferrule and into the handle, and another part engaging the cultivator yoke, and means securing the keeper to the ferrule.

4. A combination agricultural appliance comprising a handle, a ferrule surrounding an end of the handle, a cultivator having a tapered extension secured in the portion of the handle housed in said ferrule, and means extending into said handle and gripping said cultivator whereby the handle cannot come loose from the ferrule and the cultivator cannot come loose from the handle.

CLEVELAND G. SWISHER.